United States Patent
Wang

(10) Patent No.: US 7,354,372 B2
(45) Date of Patent: *Apr. 8, 2008

(54) ACTUATOR FOR SHIFT-BY-WIRE AUTOMATIC TRANSMISSION SYSTEM

(75) Inventor: Yong Qiang Wang, Rochester Hills, MI (US)

(73) Assignee: Dura Global Technologies, Inc., Rochester Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 11/762,452

(22) Filed: Jun. 13, 2007

(65) Prior Publication Data
US 2007/0235281 A1    Oct. 11, 2007

Related U.S. Application Data

(63) Continuation of application No. 10/985,809, filed on Nov. 8, 2004, now Pat. No. 7,241,244.

(60) Provisional application No. 60/525,026, filed on Nov. 25, 2003.

(51) Int. Cl.
*F16H 48/06* (2006.01)

(52) U.S. Cl. ............... 475/155; 475/149; 475/153; 475/154; 475/156; 475/157; 475/317; 188/1.12; 188/31; 188/156; 188/158; 188/161; 188/163; 188/171; 192/226

(58) Field of Classification Search ............... 475/149, 475/153, 154, 155, 156, 157, 317; 188/1.12, 188/31, 156, 158, 161, 163, 171; 192/226
See application file for complete search history.

(56) References Cited

U.S. PATENT DOCUMENTS

| 2,266,164 | A  | * | 12/1941 | Claytor ................ 290/50 |
| 2,655,820 | A  | * | 10/1953 | Baines ................ 475/155 |
| 5,378,210 | A  | * | 1/1995  | Teraoka .............. 475/312 |
| 5,827,149 | A  | * | 10/1998 | Sponable .............. 477/92 |
| 6,199,442 | B1 | * | 3/2001  | Bauer et al. ........ 74/411.5 |
| 6,428,442 | B1 | * | 8/2002  | Turgay et al. ....... 475/321 |
| 6,484,598 | B2 | * | 11/2002 | Peter .................. 74/335 |
| 7,241,244 | B2 | * | 7/2007  | Wang ................ 475/155 |
| 2002/0096342 | A1 | * | 7/2002  | Milbourne ........... 173/178 |
| 2002/0134185 | A1 | * | 9/2002  | Tsuzuki et al. ..... 74/473.1 |

* cited by examiner

*Primary Examiner*—David D. Le
(74) *Attorney, Agent, or Firm*—Richard M. Mescher; Porter, Wright, Morris & Arthur; Dean B. Watson

(57) ABSTRACT

An electric actuator for an automatic transmission includes an adapter to transmit rotary motion between the adapter and the automatic transmission. An electric motor has an output shaft operably connected to the adapter by a gear set which includes a ring gear. The gear set reduces speed and increases torque supplied by the output shaft of the electric motor and applied to the adapter. A release mechanism is operably connected to the gear set and includes a lock member movable between a first position wherein the lock member is in engagement with the ring gear to lock the ring gear against rotary motion in both directions and a second position wherein the lock member is out of engagement with the ring gear to permit rotary motion of the ring gear in both directions.

11 Claims, 8 Drawing Sheets

ACTUATOR FOR SHIFT-BY-WIRE AUTOMATIC TRANSMISSION SYSTEM

CROSS-REFERENCE TO RELATED APPLICATIONS

This application is a continuation of U.S. patent application Ser. No. 10/985,809 filed on Nov. 8, 2004 now U.S. Pat. No. 7,241,244 which claims the benefit of U.S. provisional patent application No. 60/525,026 filed on Nov. 25, 2003, the disclosures of which are expressly incorporated herein in their entireties by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to an electronically controlled automatic transmission system for motor vehicles, and more particularly, an improved electric actuator for such an automatic transmission system.

BACKGROUND OF THE INVENTION

An electronically controlled transmission system is commonly referred to as a "shift-by-wire" transmission system. In some shift-by-wire automatic transmission systems, an input shaft outwardly projects from a transmission gear housing and is rotated to shift gears in the transmission. The transmission input shaft is rotated by an electric actuator coupled to the input shaft. The electric actuator selectively rotates the transmission input shaft in response to an input signal from a manually operated gear shifter or gear selector. The gear selector is typically a lever but can alternatively be in other forms such as push buttons.

Typical electric actuators of shift-by-wire transmission systems have an electric motor which rotates the device repeatedly back and forth until the transmission input shaft is in the exact gear position that is desired. This can result in relatively slow and inaccurate shifting. Accordingly, there is a need for an improved electric actuator for shift-by-wire automatic transmission systems.

SUMMARY OF THE INVENTION

The present invention provides an electric actuator for an automatic transmission which overcomes at least some of the above-noted problems of the related art. According to the present invention, an electric actuator for an automatic transmission includes an adapter to transmit rotary motion between the adapter and the automatic transmission. An electric motor has an output shaft operably connected to the adapter by a gear set which includes a ring gear. The gear set reduces speed and increases torque supplied by the output shaft of the electric motor and applied to the adapter. A release mechanism is operably connected to the gear set and includes a lock member movable between a first position wherein the lock member is in engagement with the ring gear to lock the ring gear against rotary motion in both directions and a second position wherein the lock member is out of engagement with the ring gear to permit rotary motion of the ring gear in said both directions.

According to another aspect of the present invention, an electric actuator for actuating an automatic transmission includes, in combination, an adapter for connection to the automatic transmission to transmit rotary motion between the adapter and the automatic transmission and an electric motor having an output shaft. A gear set operably connects the output shaft and the adapter. The gear set includes a ring gear. A release mechanism is operably connected to the gear set and includes a solenoid operably connected to a lock member to selectively move the lock member between first and second positions. In the first position, the lock member is in engagement with the ring gear to lock the ring gear against rotary motion in both directions. In the second position, the lock member is out of engagement with the ring gear to permit rotary motion of the ring gear in both directions.

According to yet another aspect of the present invention, a method for actuating a shift-by-wire automatic transmission includes the steps of, in combination, providing an adapter for connection to the automatic transmission to transmit rotary motion between the adapter and the automatic transmission and providing an electric motor having an output shaft operably connected to the adapter. A release mechanism is provided which is operably connected to the adapter and the electric motor. The release mechanism is selectively moved between first and second positions. In the first position, the lock member is in engagement with the ring gear to lock the ring gear against rotary motion in both directions. In the second position, the lock member is out of engagement with the ring gear to permit rotary motion of the ring gear in both directions.

From the foregoing disclosure and the following more detailed description of various preferred embodiments it will be apparent to those skilled in the art that the present invention provides a significant advance in the technology of electric actuators for electronically controlled automatic transmissions. Particularly significant in this regard is the potential the invention affords for providing a high quality, reliable, relatively fast, accurate, and low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
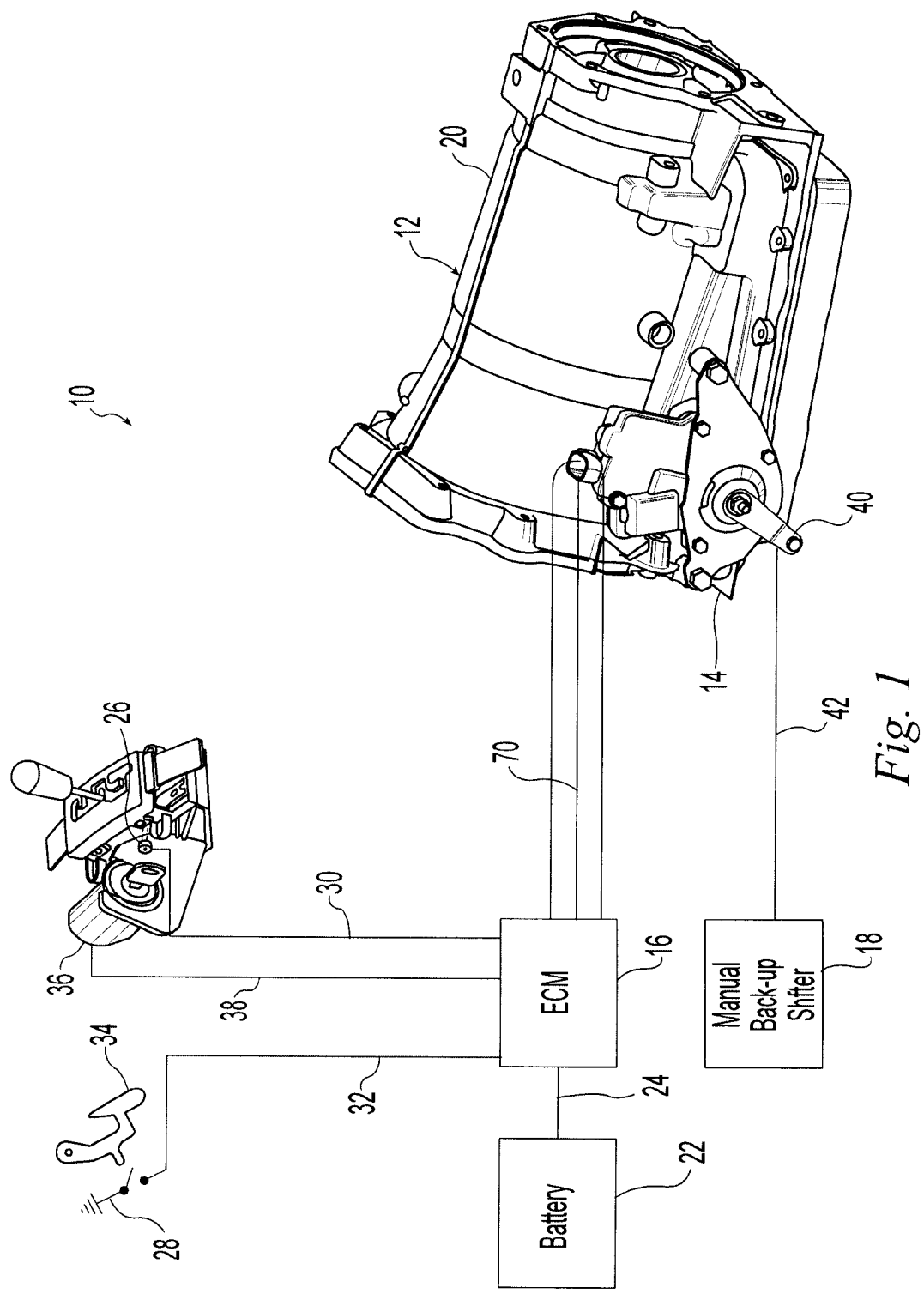
FIG. 1 is a schematic view of an electronically controlled automatic transmission system having an electric actuator according a preferred embodiment of the present invention.
Figure 2:
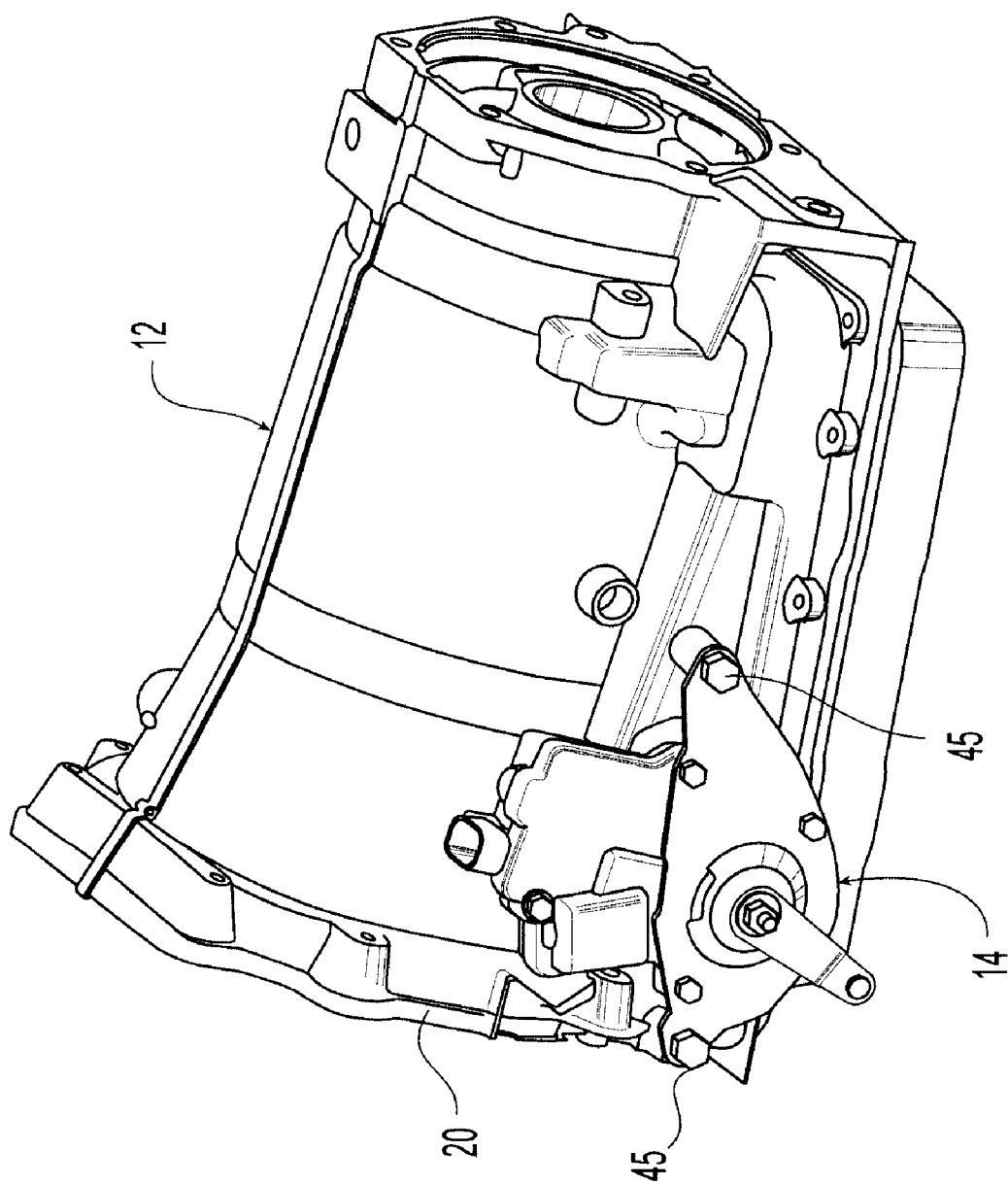
FIG. 2 is perspective view of a transmission and an electric actuator of the transmission system of FIG. 1.
Figure 3:
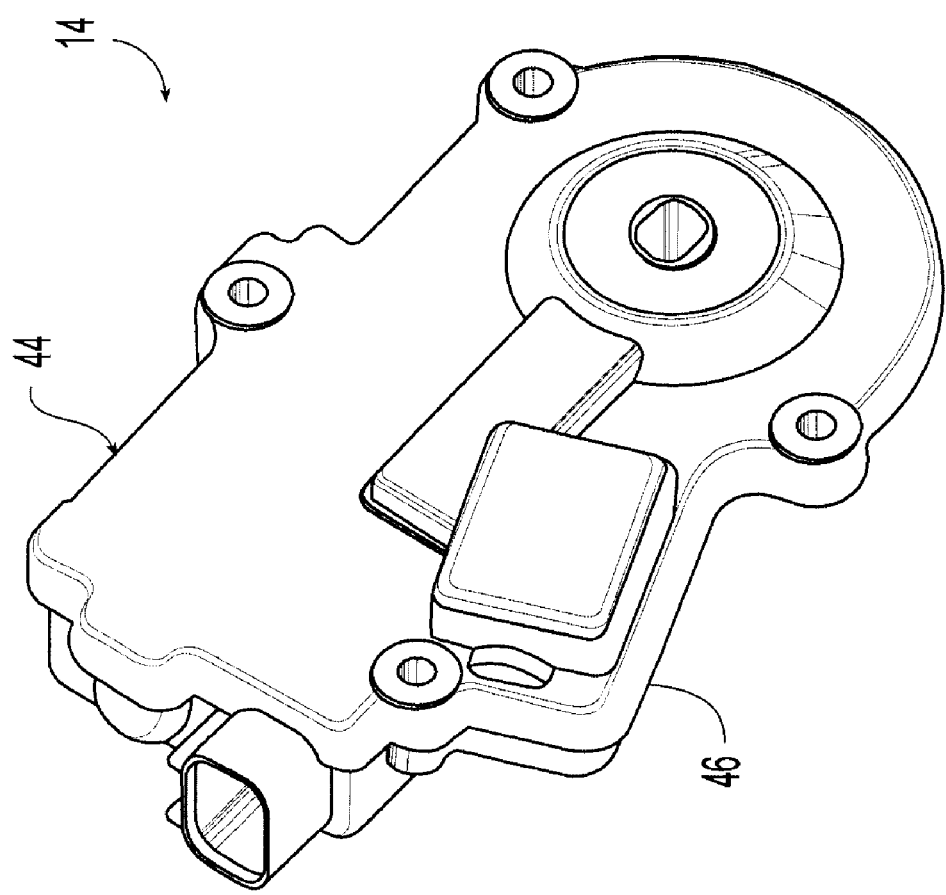
FIG. 3 is an enlarged perspective view of the electric actuator of FIGS. 1 and 2.
Figure 4:
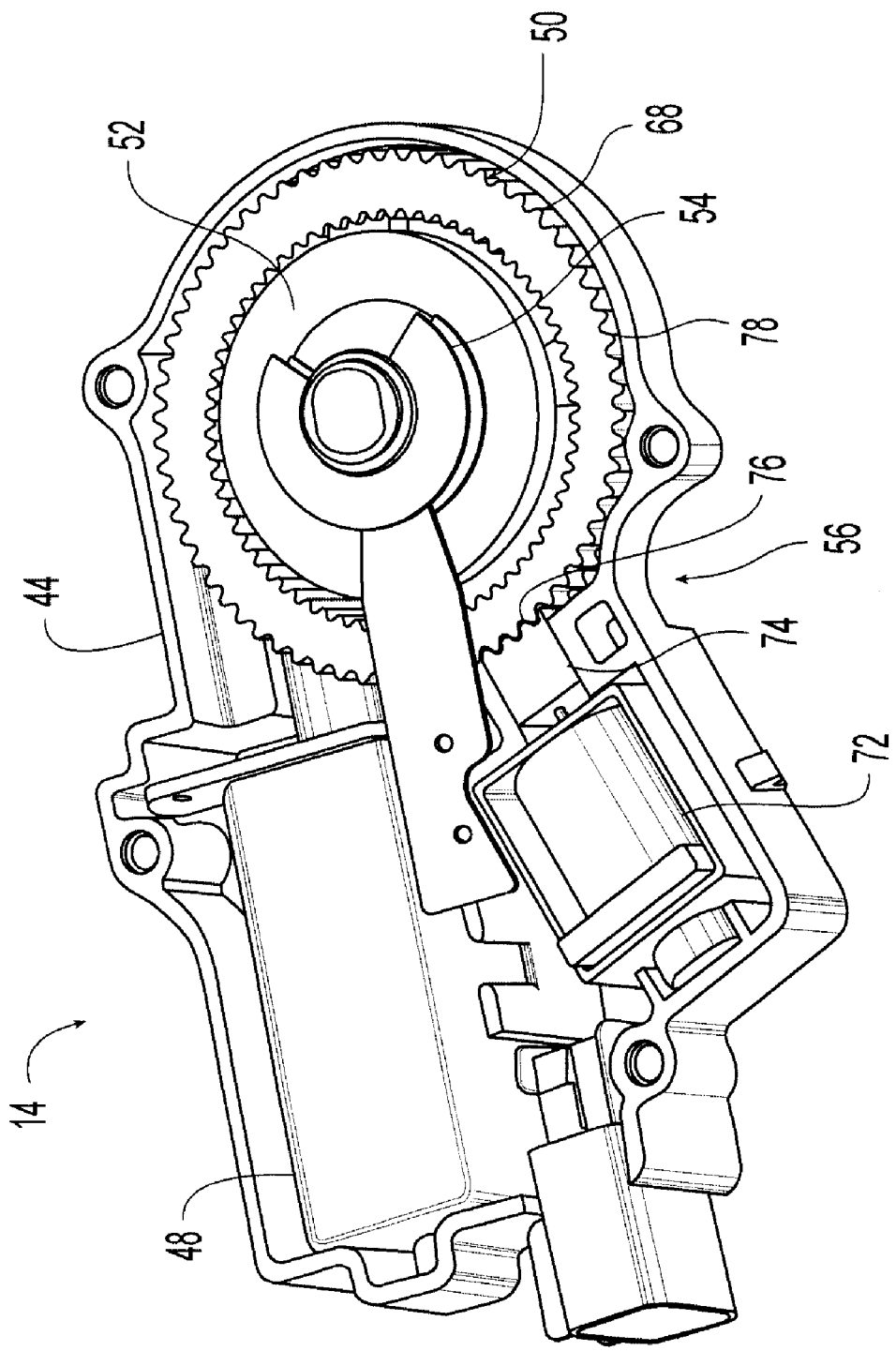
FIG. 4 is a perspective view of the electric actuator of FIGS. 1 to 3 but with a housing partially removed for clarity.
Figure 5:
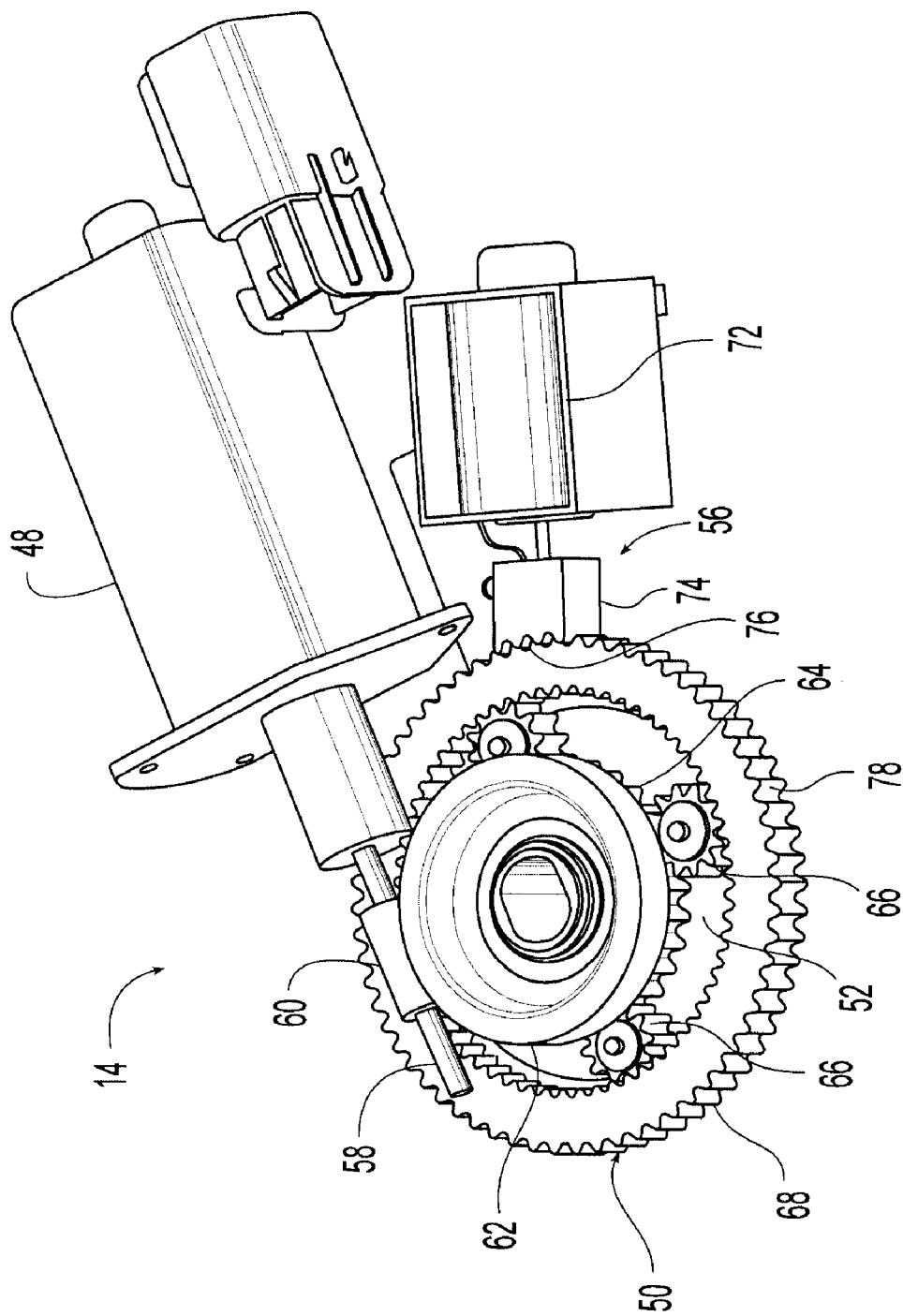
FIG. 5 is perspective view of the electric actuator of FIGS. 1 to 4 but from a reverse angle compared to FIG. 4 and with the housing removed for clarity.

It should be understood that the appended drawings are not necessarily to scale, presenting a somewhat simplified representation of various preferred features illustrative of the basic principles of the invention. The specific design features of the electric actuator as disclosed herein, including, for example, specific dimensions, orientations, and shapes will be determined by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric actuator illustrated in the drawings. In general, up or upward refers to an upward direction generally in the plane of the paper in FIG. 1 and down or downward refers to a downward direction generally in the plane of the paper in FIG. 1. Also in general, forward or front refers to a direction toward the front of the motor vehicle and rearward or rear refers to a direction toward the back of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electric actuator for an electronically controlled transmission disclosed herein. The following detailed discussion of various alternative and preferred embodiments will illustrate the general principles of the invention with reference to an electronically controlled automatic transmission for a motor vehicle. Other embodiments suitable for other applications will be apparent to those skilled in the art given the benefit of this disclosure.

Referring now to the drawings, FIG. 1 schematically shows an electronically controlled automatic transmission system 10 according to a preferred embodiment of the present invention. While the illustrated embodiments of the present invention are particularly adapted for use with an automobile, it is noted that the present invention can be utilized with any motor vehicle including trucks, sport utility vehicles, buses, vans, recreational vehicles, earth moving equipment and the like, off road vehicles such as dune buggies and the like, air borne vehicles, and water borne vehicles.

The illustrated automatic transmission system 10 includes an automatic transmission 12, an electric actuator 14 which actuates the transmission 12, an electronic control unit or module (ECM) 16 in communication with the electric actuator 14 for controlling the actuator 14 to selectively shift the transmission 12, and a manual back-up shifter 18. The transmission 12 has a plurality of gears and an input shaft or lever that pivots or rotates a detent 19 (FIG. 6) of the transmission 12 to shift between the gears of the transmission 12. The input lever typically projects laterally outward from a housing 20 of the transmission 12 while the detent 19 typically is located within the transmission housing 20. The illustrated electric actuator 14 is secured to the transmission housing 20 and is operably coupled to the transmission input lever for rotating the detent 19 in a desired manner to select a desired one of the gears in the transmission 12.

Figure 6:
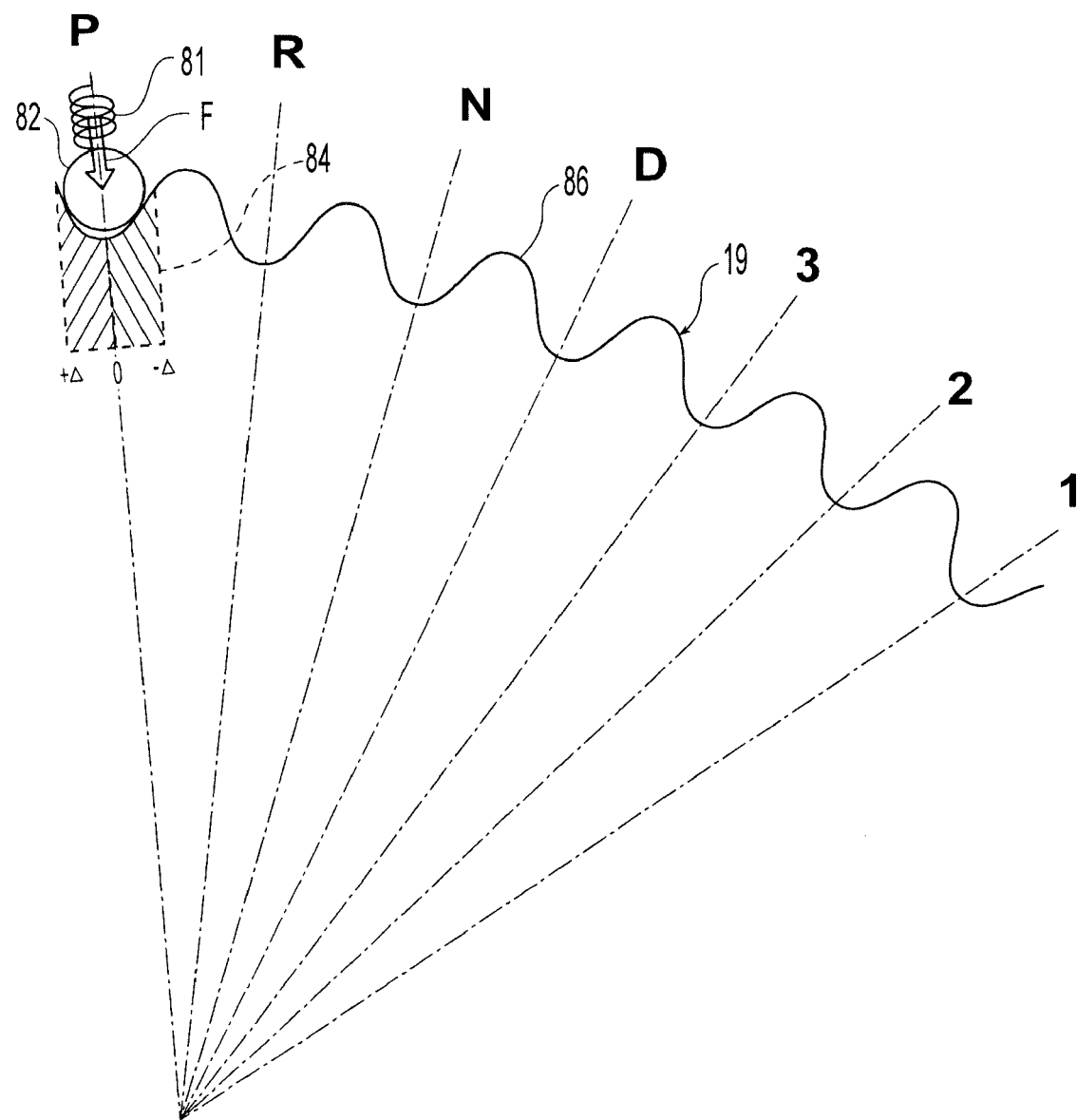
FIG. 6 is a schematic view showing a detent of the transmission of FIGS. 1 and 2 rotated by the electric actuator to within a "self-alignment zone" of a parking gear position to precisely position a detent roller in the parking gear position.

The ECM 16 is preferably a computer unit or module having processing means and memory means. The ECM 16 is preferably the central processing unit for the motor vehicle but alternatively can be a separate stand-alone unit. The ECM 16 is electrically connected to the electric actuator 14 in a suitable manner such as, for example, wires or cables. The ECM 16 is also electrically connected to a source of electric power in the motor vehicle such as, for example, a battery 22, in a suitable manner such as, for example, wires or cables 24. The ECM is additionally electrically connected to a manual gear selector or shifter 26 and a brake interlock switch 28 each in a suitable manner such as, for example, wires or cables 30, 32. The manual gear shifter 26 is used by the operator to manually input a desired one of the transmission gears. The operator positions the manual gear shifter 26 in one of a plurality of fixed positions indicating one of the plurality of transmission gears of the automatic transmission 12 such as, for example, park (P), reverse (R), neutral (N), drive (D), low 3 (3), low 2 (2), and low (1) (as best shown in FIG. 6). It is noted that the automatic transmission can alternatively have a different quantity and/or type of gears within the scope of the present invention. The manual gear shifter 26 is provided with suitable switches and/or sensors for sending an electronic signal to the ECM 16 indicating the current position of the manual gear shifter 26. It is noted that the manual gear shifter 26 can be of the illustrated lever type, or can alternatively be of a push button type, or any other suitable type. The brake interlock switch 28 is used by the ECM 16 to ensure that the operator is depressing a brake pedal 34 of the motor vehicle before the ECM 16 permits the transmission gears to be shifted out of the park gear or condition. The illustrated ECM 16 is also electrically connected to an ignition switch 36 in a suitable manner such as wires 38. The ignition switch 36 provides a control signal to ECM 16 which indicates when the ignition switch 36 is engaged so that the ECM 16 can prevent/permit certain transmission gear changes under selected conditions as ignition on or ignition off. The ECM 16 receives signals from the manual gear shifter 26, the interlock switch 28, and the ignition switch 36 and sends signals to the electric actuator 14 as described in more detail hereinafter.

The manual back-up shifter 18 is operatively connected to an attach pin 40 with a suitable cable 42 such as, for example, Bowden or a push-pull cable or the like. The attach pin 40 is preferably located outside the electric actuator 14 to ease assembly. The manual back-up shifter 18 enables the operator to manually shift the transmission 12 to a desired gear such as, for example, neutral in the event that one or more components of the electronic control system 10 fails or the motor vehicle power system fails such that the vehicle operator is unable to switch the transmission gears.

As best shown in FIGS. 2 to 5, the illustrated electric actuator 14 includes an outer actuator housing 44 that is secured to the housing 20 of the transmission 12. The illustrated actuator housing 44 is secured to the transmission housing 20 by a plurality of threaded fasteners 45 but it is noted that any other suitable means for securing the actuator housing 44 can be alternatively be utilized. The illustrated actuator housing 44 has a cover 46 which cooperates with the actuator housing 44 to enclose and contain the various components of the electric actuator 14. It is noted that the actuator housing 44 can have any suitable shape and can be formed of any suitable material.

The electric actuator 14 includes a high-speed DC electric motor 48, a gear set or gear train 50 for reducing speed and increasing torque output of the electric motor 48, an output linkage or adaptor 52 for connection to the transmission input lever and thus the transmission detent 19 to transfer rotary motion therebetween, a position sensor 54 for indicating motion or position of the electric actuator 14, and a lock or release mechanism 56 operable between first and second positions for selectively connecting and releasing the adapter 52 to and from the electric motor 48. An output shaft 58 of the electric motor 48 is drivably connected to the gear set. The illustrated output shaft 58 is provided with a worm 60 that drivingly engages a worm gear 62, the worm gear 62 transfers rotational motion to a coaxially mounted sun gear 64 that in turn operatively engages a plurality of planetary gears 66 located within a ring gear 68. The planetary gears 66 are operatively connected to the adapter 52 to transfer rotational movement from the planetary gears to the adapter 52 when the ring gear 68 is locked or held against rotation. An input signal from the ECM 16 energizes the electric motor 48 to cause the gear set 50 to rotate. Rotation of the gear set 50 drives the adapter 52 to selectively pivot or rotate the transmission input lever and the detent 19 to a desired gear position as described in more detail hereinafter.

The position switch or sensor 54 is located within the actuator housing 44 and is electrically connected to the ECM 16 in a suitable manner such as wires 70 for providing a signal indicating movement or position of the electric actuator 14 for determining the position of the adapter 52 and thus transmission input lever and the detent 19. The illustrated sensor 54 is a rotary sensor including two magnets, two steel plates and a circuit board. It is noted that any suitable type of switch or sensor can be utilized such as, for example, a contact sensor, a non-contact sensor, a rotary sensor, a linear sensor, or the like.

The release or lock mechanism 56 is adapted to selectively lock and unlock the ring gear 68 of the gear set 50 against rotation and thus either permit the planetary gears 66 and the adapter 52 to be driven by the electric motor 48 or permit the adapter 52 to be disengaged or released from the electric motor 48 so that the adapter 52 and thus the transmission input lever and the detent 19 are free to rotate relative to the electric motor 48 described in more detail hereinafter. The illustrated release mechanism 56 includes a push-type electric linear solenoid 72 and a locking member or pawl 74 operatively connected to and moved by the solenoid 72. The illustrated locking pawl 74 is provided with a row of teeth 76 that are sized and shaped to cooperate with external locking teeth 78 outwardly projecting from an outer periphery of the ring gear 68. The illustrated locking pawl 74 is linearly moved by the solenoid 72 in a radial direction toward and away from the ring gear 68 between a first or locking position and a second or unlocking position. In the locking position, the teeth 76 of the locking pawl 74 are engaged with the locking teeth 78 of the ring gear 68 to prevent the ring gear 68 from rotating. In the unlocking position, the teeth 76 of the locking pawl 74 are spaced apart and disengaged from the locking teeth 78 of the ring gear 68 so that the ring gear 68 is free to rotate.

The solenoid 72 is electrically connected to the ECM 16 in a suitable manner by such as, for example, wires or cables 42 and receives control signals therefrom to position the locking pawl 74 in a desired one of its positions. The illustrated solenoid 72 is a push-type solenoid, that is, the solenoid 72 positions the locking pawl 74 in the unlocking position when the solenoid 72 is in a retracted unenergized state and positions the locking pawl 74 in the locking position when the solenoid 72 is in an extended energized state. Thus, the solenoid 72 preferably is provided with an internal spring member or the like to resiliently return the solenoid 72 to the retracted position when power is removed and the solenoid 72 becomes unenergized. It is noted that additionally or alternatively an external spring member can be utilized to bias the locking pawl 74. It is also noted that the release mechanism 56 can alternatively take many other suitable forms within the scope of the present invention.

During operation, the operator manually moves or pivots the manual gear shifter 26 to a position indicating a desired transmission gear such as, for example, P, R, N, D, 1,2, or 3, when the operator wants to change gears of the transmission 12. The ECM 16 receives the signal from the manual gear shifter 26 indicating the desired transmission gear selected by the operator. The ECM 16 compares the desired transmission gear, indicated by the current position of the manual gear shifter 26, with the current transmission gear, indicated by the current position of the electric actuator 14. If the desired transmission gear and the current transmission gear are not the same, the ECM 16 powers the solenoid 72 to push or extend the locking pawl 74 from the unlocking position to the locking position where the locking pawl 74 engages the locking teeth 78 of the ring gear 68. With the locking pawl 74 in the locking position, the locking pawl 74 locks the ring gear 68 against rotary movement. The process of locking the ring gear 68 against rotation takes a predetermined period of time such as, for example, about 30 to about 50 milliseconds. After this predetermined period of time, or alternatively any other suitable predetermined period of time, the ECM 16 powers the electric motor 48 to rotate the adapter 52 and the transmission input lever and detent 19 operatively connected thereto toward the desired gear position. The high speed, low torque rotary output of the electric motor 48 is transferred from the worm 60 to the worm gear 62 and from the worm gear 62 to the sun gear 64. The rotary motion is then transferred to the planetary gears 66 and the adapter 52 to rotate the transmission input lever connected thereto. As a result, the high speed, low torque output of the electric motor 48 is changed to a low speed, high torque input to the adapter 52, the transmission input lever and the detent 19. In cases where the locking pawl 74 does not properly engage the locking teeth 78 to lock the ring gear 68 because of misalignment between the teeth 76, 78, the locking pawl 74 locks the ring gear 68 as soon as the ring gear 68 starts moving, that is, as soon as the ring gear 68 rotates enough to remove the misalignment between the teeth 76, 78.

When the ECM 16 determines that the transmission input lever and detent 19 are approaching the desired gear position and is within a predetermined "self-adjusting" zone 84 (shaded in FIG. 6) located about the desired gear position, based on signals from the sensor 54, the ECM 16 simultaneously shuts off the electric motor 48 and the solenoid 72. The size of the self-adjusting zone 84 is determined by distances in each direction from the exact gear position in which the transmission 12 will self-align due to internal forces when the electric actuator 14 is unlocked as described in more detail hereinafter. With power to the electric motor 48 turned off, rotary torque applied to the adapter 52, and thus the transmission input lever and the detent 19, is stopped to halt motion of the detent 19. With the solenoid power off, the locking pawl 74 automatically snaps from its locking position to its unlocking position so that the ring gear 68 is free to rotate. With the ring gear 68 free to rotate, the planetary gears 66 and the adapter 52, and thus the transmission input shaft and the detent 19, are free to rotate relative to the sun gear 64, the worm gear 62, the worm 60, and the motor output shaft 58.

As best shown in FIG. 6, a transmission detent spring 81 provides a resilient force F to engage a rolling detent member 82, such as a ball or roller, with a detent profile 86 of the detent 19. This force F causes rotation of the detent 19 until the detent member 82 is seated in its lowest position within a recess of the detent profile 86, which is the exact desired gear position, when the electric actuator 14 locates the detent 19 very close to the desired gear position, that is within the "self-adjusting" zone 84 (the shaded portion in FIG. 6), and the release mechanism 56 is unlocked so that the ring gear 68, the adapter 52, the transmission input lever, and the detent 19 are free to rotate. Thus, the electric actuator 14 permits the transmission 12 to automatically self align to the exact desired gear position. Due to this self-alignment, the ECM 16 does not need to finely adjust the position of the detent 19 by moving it back and forth if the detent 19 is not exactly in the exact desired gear position such as in the case of over travel or under travel. In the case of power failure or a dead battery, the sun gear 64 is preferably locked against rotation because the electric motor 48 is magnetically locked and or the worm 60 and the worm gear are configured to have a self-locking feature. However, because the ring gear 68 is unlocked and free to rotate, the back-up shifter 18 can be manually moved to manually move the attach pin 40, the adapter 52 and the transmission detent to a desired gear position.

Figure 7:
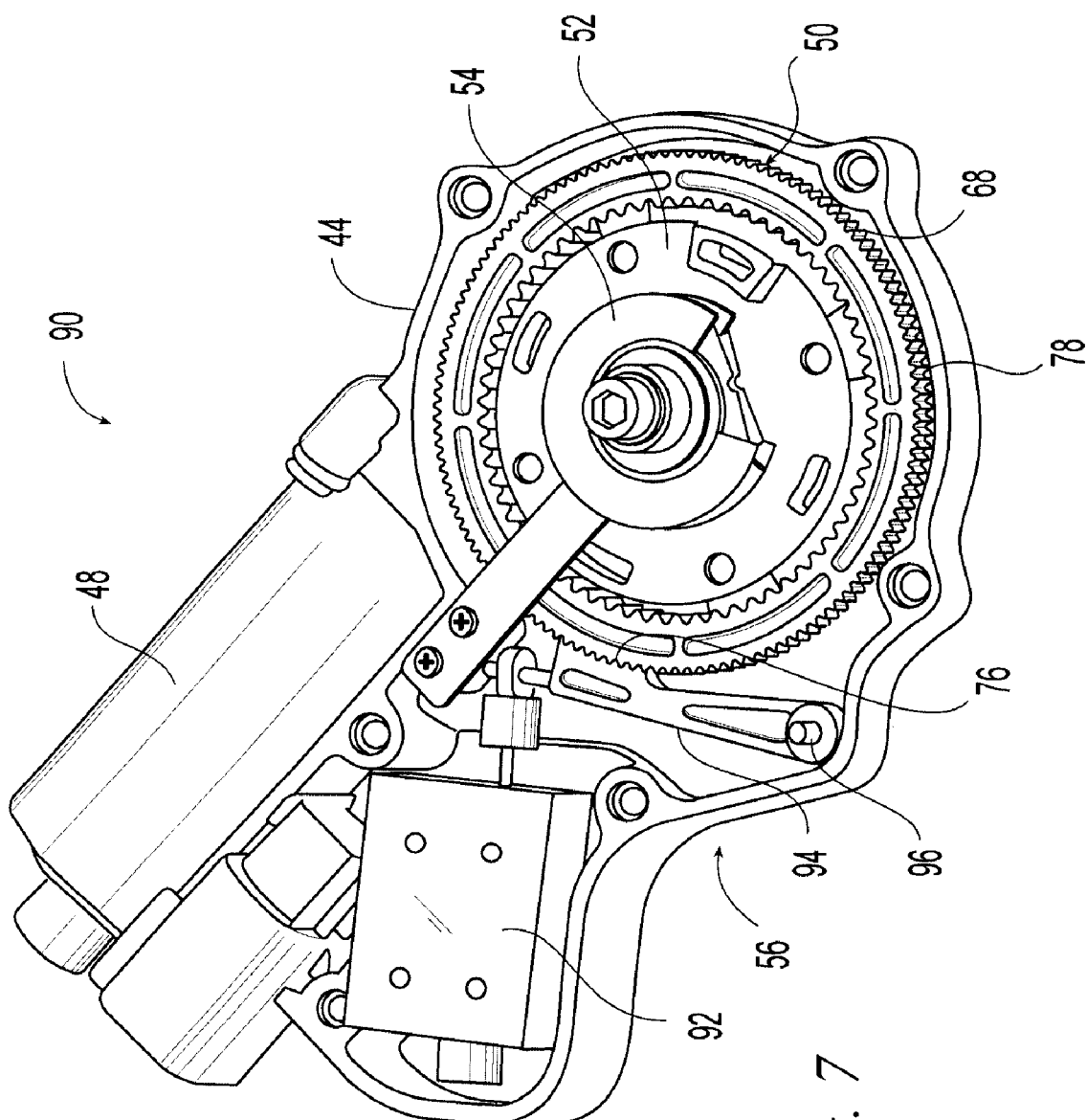
FIG. 7 is a perspective view similar to FIG. 4 but showing an electric actuator according to an alternative preferred embodiment of the present invention with a housing partially removed for clarity.

FIG. 7 shows an electric actuator 90 according to an alternative embodiment of the present invention wherein common reference numbers are utilized to indicate common structure. The electric actuator 90 is substantially the same as the electric actuator 14 of the first embodiment except that a pull-type electric solenoid 92 is used rather than the push-type electric solenoid 72. This electric actuator 90 demonstrates that the various components such as the release mechanism 56 can take many forms within the scope of the present invention.

The illustrated release mechanism 56 of the second embodiment includes the pull-type electric linear solenoid 92 and a locking member or pawl 94 operatively connected to and moved by the solenoid 92. The illustrated locking pawl 94 is provided with the row of teeth 76 that are sized and shaped to cooperate with the external locking teeth 78 outwardly projecting from an outer periphery of the ring gear 68. The locking pawl 94 is pivoted about a pivot 96 by the solenoid 92 toward and away from the ring gear 68 between an unlocking position and a locking position. In the unlocking position, the teeth 76 are spaced apart from and disengaged from the locking teeth 78 of the ring gear 68 so that the ring gear 68 is free to rotate. In the locking position, the teeth 76 are engaged with the locking teeth 78 of the ring gear 68 to prevent the ring gear 68 from rotating.

The solenoid 92 is electrically connected to the ECM 16 in a suitable manner such as, for example by wires or cables 42 and receives control signals therefrom to position the locking pawl 94 in a desired one of its positions. The illustrated solenoid 92 is a pull-type solenoid, that is, the solenoid 92 positions the locking pawl 94 in the locking position when the solenoid 92 is in an extended unenergized state and positions the locking pawl 94 in the unlocking position when the solenoid 92 is in a retracted energized state. Thus, the solenoid 92 is preferably provided with an internal spring member or the like to resiliently return the solenoid 72 to the extended locking position when power is removed and the solenoid 92 becomes unenergized. It is noted that additionally or alternatively an external spring member can be utilized to bias the locking pawl 94. It is also noted that the release mechanism 56 can alternatively take many other suitable forms within the scope of the present invention.

Operation of the electric actuator 90 according to the second embodiment is substantially the same as the first embodiment except that the solenoid must be powered to unlock the ring gear 68 rather than unpowered to un lock the ring gear 68. When the ECM 16 determines that the transmission input lever and detent 19 are approaching the desired gear position and is within the predetermined "self-adjusting" zone 84, based on signals from the sensor 54, the ECM 16 simultaneously shuts off the electric motor 48 and turns on the solenoid 72. With power to the electric motor 48 turned off, rotary torque applied to the adapter 52, and thus the transmission input lever and the detent 19, is stopped to halt motion of the detent 19. With the solenoid power on, the locking pawl 74 is moved from its locking position to its unlocking position so that the ring gear 68 is free to rotate. With the ring gear 68 free to rotate, the planetary gears 66 and the adapter 52, and thus the transmission input shaft and the detent 19, are free to rotate relative to the sun gear 64, the worm gear 62, the worm 60, and the motor output shaft 58. This permits the transmission 12 to self-align the detent member 82 to the exact desired gear position. The solenoid 92 is only powered for a predetermined time such as, for example, about 100 milliseconds or until driver again moves the manual gear shifter 26 so that the ring gear 68 is again locked once the transmission self-aligns. It is noted that the solenoid 92 can alternatively be powered for any other suitable period of time.

Figure 8:
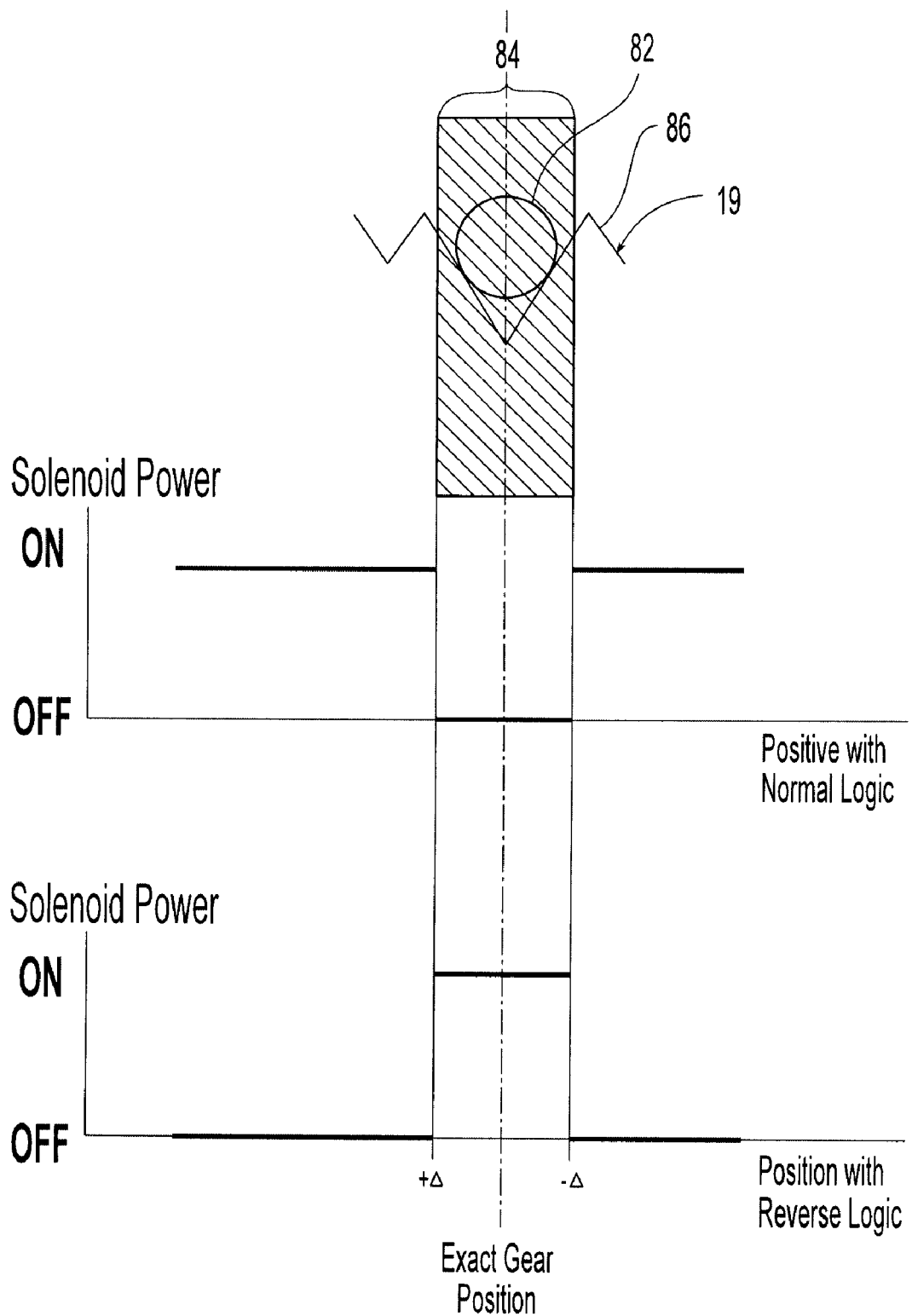
FIG. 8 a graphic view comparing solenoid power of a locking device relative to detent position for the electric actuators of FIG. 4 and FIG. 7.

As best shown in FIG. 8, the electric actuator 14 according to the first embodiment of the present invention maintains the solenoid 72 in a power on condition all of the time during movement to lock the ring gear 68 except when the sensor 54 detects the adapter 52 is in a position where the detent 19 is entering the "self-adjusting" zone 84 of the desired gear position and power to the solenoid 72 is shut off so that the solenoid 72 defaults to unlock the ring gear 68 (referred to herein as "normal logic"). In contrast, the electric actuator 90 according to the second embodiment of the present invention maintains the solenoid in a power-off condition during movement so that the solenoid 92 defaults to lock the ring gear 68 except when the sensor 54 detects the adapter 52 is in a position where the detent 19 is entering the "self-adjusting" zone 84 of the desired gear position and power to the solenoid 72 is turned on so that the solenoid 72 unlocks the ring gear 68 (referred to herein as "reverse logic"). It is noted that the "reverse logic" system is capable of making a gear shift at any time, even if the solenoid 92 is defective or there is power lost to the solenoid 92 because the solenoid 92 defaults to the locking position. In such a case, however, there will be a loss of the self-aligning feature. It is also noted that the "reverse logic" system requires a stronger solenoid 92 because the spring member must be strong enough to lock the ring gear 68 at certain torque conditions and the solenoid 92 has to be strong enough to overcome the spring force to pull the locking pawl 94 to the unlocking position.

It should be appreciated from the foregoing detailed description of the present invention that the electric actuator 14, 90 allows the transmission 12 to automatically self-align using the assistance of the detent spring 81 of the transmission 12 by correctly timing the powering and unpowering of the solenoid 72, 92 to lock and unlock the ring gear 68. There is no need for the electric motor 48 to finely adjust the position of the transmission input lever and detent 19 by the motor 48 moving them back and forth back and forth to position the detent 19 into the exact desired gear position. Thus, the electric actuator 14, 90 enables the transmission 12 to be shifted faster and more accurately than any prior art electric actuator.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An electric actuator for an automatic transmission, said electric actuator comprising, in combination:
   an adapter for connection to the automatic transmission to transmit rotary motion between the adapter and the automatic transmission;
   an electric motor having an output shaft operably connected to the adapter;
   a gear set operably connecting the adapter and the output shaft to reduce speed and increase torque supplied by the output shaft of the electric motor and applied to the adapter;
   wherein the gear set includes a ring gear; and
   a release mechanism operably connected to the gear set and including a lock member movable between a first position wherein the lock member is in engagement with the ring gear to lock the ring gear against rotary motion in both directions and a second position wherein the lock member is out of engagement with the ring gear to permit rotary motion of the ring gear in said both directions;
   wherein the release mechanism includes an electric solenoid operably connected to the lock member to selectively move the lock member between the first and second positions;
   wherein the electric solenoid is a pull-type solenoid that retracts when energized.

2. An electric actuator for an automatic transmission, said electric actuator comprising, in combination:
   an adapter for connection to the automatic transmission to transmit rotary motion between the adapter and the automatic transmission;
   an electric motor having an output shaft operably connected to the adapter;
   a gear set operably connecting the adapter and the output shaft to reduce speed and increase torque supplied by the output shaft of the electric motor and applied to the adapter;
   wherein the gear set includes a ring gear; and
   a release mechanism operably connected to the gear set and including a lock member movable between a first position wherein the lock member is in engagement with the ring gear to lock the ring gear against rotary motion in both directions and a second position wherein the lock member is out of engagement with the ring gear to permit rotary motion of the ring gear in said both directions;
   wherein the release mechanism includes an electric solenoid operably connected to the lock member to selectively move the lock member between the first and second positions;
   wherein the lock member is in the first position when electric solenoid is unenergized.

3. An electric actuator for actuating an automatic transmission, said electric actuator comprising, in combination:
   an adapter for connection to the automatic transmission to transmit rotary motion between the adapter and the automatic transmission;
   an electric motor having an output shaft,
   a gear set operably connecting the output shaft and the adapter to reduce speed and increase torque supplied by the output shaft of the electric motor and applied to the adapter;
   wherein the gear set includes a ring gear; and
   a release mechanism operably connected to the gear set and including a solenoid operably connected to a lock member to selectively move the lock member between a first position wherein the lock member is in engagement with the ring gear to lock the ring gear against rotary motion in both directions and a second position wherein the lock member is out of engagement with the ring gear to permit rotary motion of the ring gear in said both directions.

4. The electric actuator according to claim 3, wherein the lock member linearly moves into and out of engagement with the ring gear.

5. The electric actuator according to claim 3, wherein the lock member pivots into and out of engagement with the ring gear.

6. The electric actuator according to claim 3, wherein the solenoid is a push-type electric solenoid that extends when energized.

7. The electric actuator according to claim 3, wherein the solenoid is a pull-type electric solenoid that retracts when energized.

8. The electric actuator according to claim 3, wherein the solenoid is an electric solenoid and the lock member is in the first position when electric solenoid is energized.

9. The electric actuator according to claim 3, wherein the solenoid is an electric solenoid and the lock member is in the first position when electric solenoid is unenergized.

10. The electric actuator according to claim 3, wherein the gear set includes worm secured to the output shaft for rotation therewith, a worm gear rotatably driven by the worm, a sun gear coaxially secured to the worm gear for rotation therewith, and a plurality of planetary gears operatively engaging the sun gear and located within the ring gear, and wherein the adapter is operatively secured to the plurality of planetary gears to transfer rotary motion therebetween.

11. The electric actuator according to claim 3, further comprising a sensor providing a signal indicative of a position of the adapter.

* * * * *